United States Patent
Silva et al.

(10) Patent No.: US 10,449,930 B1
(45) Date of Patent: Oct. 22, 2019

(54) CLOUD BASED COGNITIVE RADIO FREQUENCY INTRUSION DETECTION AUDIT AND REPORTING

(71) Applicant: International Business Machines Corporation, Armonk, NY (US)

(72) Inventors: Bruno S. Silva, Plano, TX (US); Diogo S. Araujo, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/002,174

(22) Filed: Jun. 7, 2018

(51) Int. Cl.
| | |
|---|---|
| *B60R 25/24* | (2013.01) |
| *B60R 25/33* | (2013.01) |
| *B60R 25/10* | (2013.01) |
| *G06N 5/04* | (2006.01) |
| *B60R 25/20* | (2013.01) |
| *G06N 20/00* | (2019.01) |

(52) U.S. Cl.
CPC ........ *B60R 25/246* (2013.01); *B60R 25/1003* (2013.01); *B60R 25/2018* (2013.01); *B60R 25/33* (2013.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 3,794,992 A | 2/1974 | Gehman | |
| 8,768,565 B2* | 7/2014 | Jefferies | G07B 15/00 |
| | | | 701/29.6 |
| 9,688,247 B1* | 6/2017 | Jayaraman | B60R 25/24 |
| 9,911,255 B2* | 3/2018 | Lee | G07C 9/00007 |
| 2007/0149139 A1 | 6/2007 | Gauvreau | |
| 2013/0338914 A1* | 12/2013 | Weiss | G08G 1/09626 |
| | | | 701/465 |
| 2016/0055699 A1* | 2/2016 | Vincenti | G07C 9/00309 |
| | | | 340/5.61 |

FOREIGN PATENT DOCUMENTS

| | | |
|---|---|---|
| JP | 2007232407 | 9/2007 |
| WO | 201116658 | 2/2011 |

* cited by examiner

*Primary Examiner* — Carlos Garcia
(74) *Attorney, Agent, or Firm* — VanLeeuwen & VanLeeuwen; Jeffrey S. LaBaw

(57) ABSTRACT

An approach is provided that receives radio frequency (RF) requests at a vehicle. The approach determines that the received request is a possible unauthorized intrusion. The approach then responsively transmits a confirmation request to a mobile device associated with an authorized user of the vehicle and safeguards the vehicle until a positive confirmation is received at the vehicle from the mobile device.

20 Claims, 6 Drawing Sheets

CLOUD BASED COGNITIVE RADIO FREQUENCY INTRUSION DETECTION AUDIT AND REPORTING

BACKGROUND OF THE INVENTION

Currently devices, such as automotive vehicles, face a change of paradigm, with the addition of mobile communication with the Internet (e.g., connected car, etc.) and with becoming an IoT ("Internet of Things") device. These changes introduce new concerns and challenges related to security for these devices. Traditional approaches identify malicious code or injections made into a radio frequency (RF) system and help to statically detect them. Although these approaches help detect possible security breaches into vehicles, they also introduce troubleshooting issues where only highly skilled personal and vendors can have access to the data and can understand it through extensive correlation and analysis to assist the manufacturers to correct an issue, either with software updates or in a new software version. However, being a passive response action, traditional approaches act too late to prevent initial security issues that might exploit a vulnerability found in the RF system.

SUMMARY

An approach is provided that receives radio frequency (RF) requests at a vehicle. The approach determines that the received request is a possible unauthorized intrusion. The approach then responsively transmits a confirmation request to a mobile device associated with an authorized user of the vehicle and safeguards the vehicle until a positive confirmation is received at the vehicle from the mobile device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
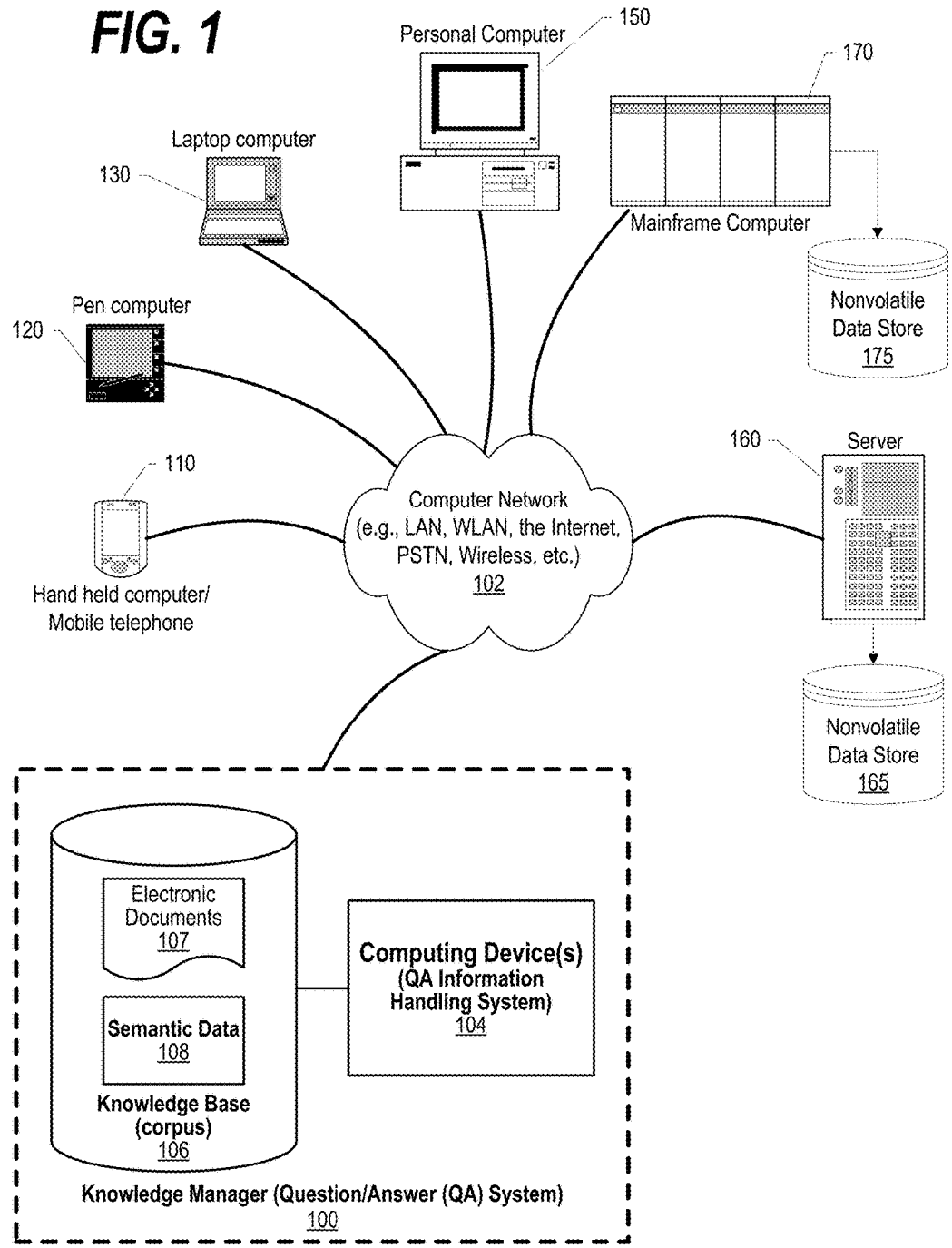
FIG. 1 depicts a network environment that includes a knowledge manager that utilizes a knowledge base.

FIGS. 1-6 describe an approach that provide a cloud based cognitive radio frequency intrusion detection audit and reporting system. This approach is composed of several components. These components include an RF Intrusion detection system that is based of behavioral and heuristic signatures deployed inline with the vehicle circuits or through software, which can detect malicious activities. Another component is a cloud based cognitive deep learning system. This system can use machine information of previous signatures and behaviors detected by different event sources such as articles, social media, previous RF Intrusion detection detected incidents, threat feeds, vendor feedbacks, and the like. Another component is a cloud based audit system. The audit system can log all RF activity and provide such activity a mobile cognitive interface based on human interaction and questions such as: "Was my vehicle locked all the time during the past hour?" or "Did we detect any malicious activity over the past hour?", and providing responses such as: "Yes" or "No".

Another component is a cloud based cognitive reporting system. This is a reporting engine that correlates information collected through the signatures enabled on the RF intrusion detection system and presents it to a user based on human interaction with questions such as: "Provide me with the top 10 newest signatures" or "give me the possible vulnerabilities that can affect my car." A further component is a cloud based database, such as a knowledge base. The knowledge base is a cloud-based database that is capable of retaining the collected and learned data for analysis for a knowledge manager, such as a QA system. A cloud based advisory system: is a component that can process natural language questions posed by a human user and issue responses based on questions. This component works with a mobile application component which is an application that will work as a user front-end for the user and forward requests to the user based on processing performed by the intrusion detection system. The mobile application provides information to the authorized user in a human readable format or presents the information in a dashboard based on learned information from item.

In addition to traditional QA systems, there are other machine-learning algorithms we can use to acquire the same information, such as: Time-series anomaly detection (TSAD) which has a series of algorithms bound to it. Any of the TSAD algorithms can be used to baseline radio frequency and accumulate data, finding patterns of unlock or a deviation in the pattern to alert. For example, assume the user started using the car with the beginning of this a TSAD graph, and everyday the user drives the car to work and then parks it and locks it from 8 am to 5 pm. All the sudden an unknown FOB key unlocks it at 11:30 am. This accumulated data will be analyzed by the TSAD algorithm and be reported as an anomaly and sent to the user's mobile application for authorization and until I authorize it, the car remains locked.

Other machine-learning algorithm that can be utilized to implement the approach described herein is NPL (Natural processing language combined with k-means which essentially processes readable data and compiles pertinent information based on queries received from a user, such as "Is this parking zone safe?" (this is compiled through social media feeds using NPL [Natural processing language]), "Provide me with statistics of stolen cars in this area?" (this can be compiled from social media feeds or through police web-site using NPL), "Are there events in the area my GPS is taking me to?" (this is compiled through social media feeds), "How many FOB keys have I used to unlock my car?" (This can be compiled through the application and learned FOB keys used in the vehicle), "How many times have my car been unlocked since I left?" (this can be compiled using time series anomaly detection algorithm), "How many times have I unlocked my car since last week?" (this can be compiled using time series anomaly detection algorithm), "How many threats have been reported through the vehicle manufacturer feed?" (this can be compiled through NPL from the manufacturer's web-site), and "How many security related updates have my car suffered?" (this can be compiled through NPL from the manufacturer's web-site). NPL will then retrieve and analyze the context of the information and identify possible past problems in the area from several feeds and cluster them into good feedbacks and bad feedbacks, if the bad feedbacks in the context of the question are larger than the positive, then the machine-learning algorithm classifies it as a bad area to park, etc.

Inventive Steps:

The approach is based on an interactive system that brings the user closer to their vehicle asset and also allows the user to be on top of security issues. The approach provides a human interface of the system that makes it easier for users to understand security related issues and a human-like interaction system that can help users report breaches to manufacturers and help improve their security development for vehicles. In one embodiment, the approach utilizes a cloud based system, called a knowledge manager or QA system, that can access a large data store of different triggered signatures and information and that can be correlated the system.

In one embodiment, the cloud based cognitive radio frequency intrusion detection audit and reporting system performs a number of steps to provide vehicle intrusion protection. The steps shown can be performed in a different order than as described below. The approach utilizes a human interaction with the advisory interface. In the case where a user is pro-active and asks the advisory system, some of the steps described below are not performed.

General steps of one embodiment of an example implementation include deploying new signatures of RF systems into RF Intrusion detection systems. The "deep learning system" uses machine learning to learn about new vulnerabilities on RF systems and deployed signatures to the RF Intrusion detection systems. The deep learning system stores the learned information into cloud database that is accessible from a knowledge manager. The deep learning system pushes feedback into a mobile app used on an authorized user's mobile device. The RF intrusion detection system detects a possible RF breach into the user's vehicle (a connected car) and reports it to the audit system. Information reported to audit system is then pushed to the deep learning system to be correlated with previously learned information.

The deep learning system generates correlations and human readable information and pushes it to the reporting system and stores the information into the cloud database. The deep learning system issues a notification to the mobile app, such as notifying the authorized user of the vehicle of a possible attempted security breach at the vehicle based on a received RF request. The mobile app presents a notification to owner and the user can respond accordingly (e.g., confirm unlock request, inhibit unlock request, etc.). The user can issue questions to an advisory system through the mobile app about the notification. The mobile app queries the audit and reporting system based on interpreted question from user. The audit and reporting systems correlate the information, and push the data back to the user's mobile interface as well as storing the information into the cloud database. The user receives the information into the user's mobile app on the user's mobile device, reads the information, and possibly reports the information to the manufacturer.

This approach provides a novelty of helping vendors and users interact over multiple as well as same-day activities and better report incidents, speeding up security progression of these devices to prevent further actions in the future. In addition, the use of a cognitive system to interact with the user of a vehicle makes it easier for any type of user, with little or no limitations regarding geographical borders or language, to help in protecting systems. One value of this approach lies on the user having a better interaction with the system over malicious activity detected at a vehicle and allows a user to confirm or deny a request received at a vehicle. In providing these advantages, this approach improves current vehicle security systems by providing a system that safeguards a user's vehicle. The safeguarding can include leaving the vehicle locked (ignoring the RF "unlock" request), transmitting data to from the system to law enforcement regarding the vehicle's location and the suspected attempt to gain unauthorized access, as well as performing other safeguarding actions sending a command to the vehicle to sound an audible alarm at the vehicle that might serve to deter the unauthorized user from further attempts to gain access to the vehicle.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers. Inputs to QA system 100 are also gathered by an on-board system included in a vehicle that employs the system described herein (see FIG. 3 for an example of such a vehicle and on-board system).

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
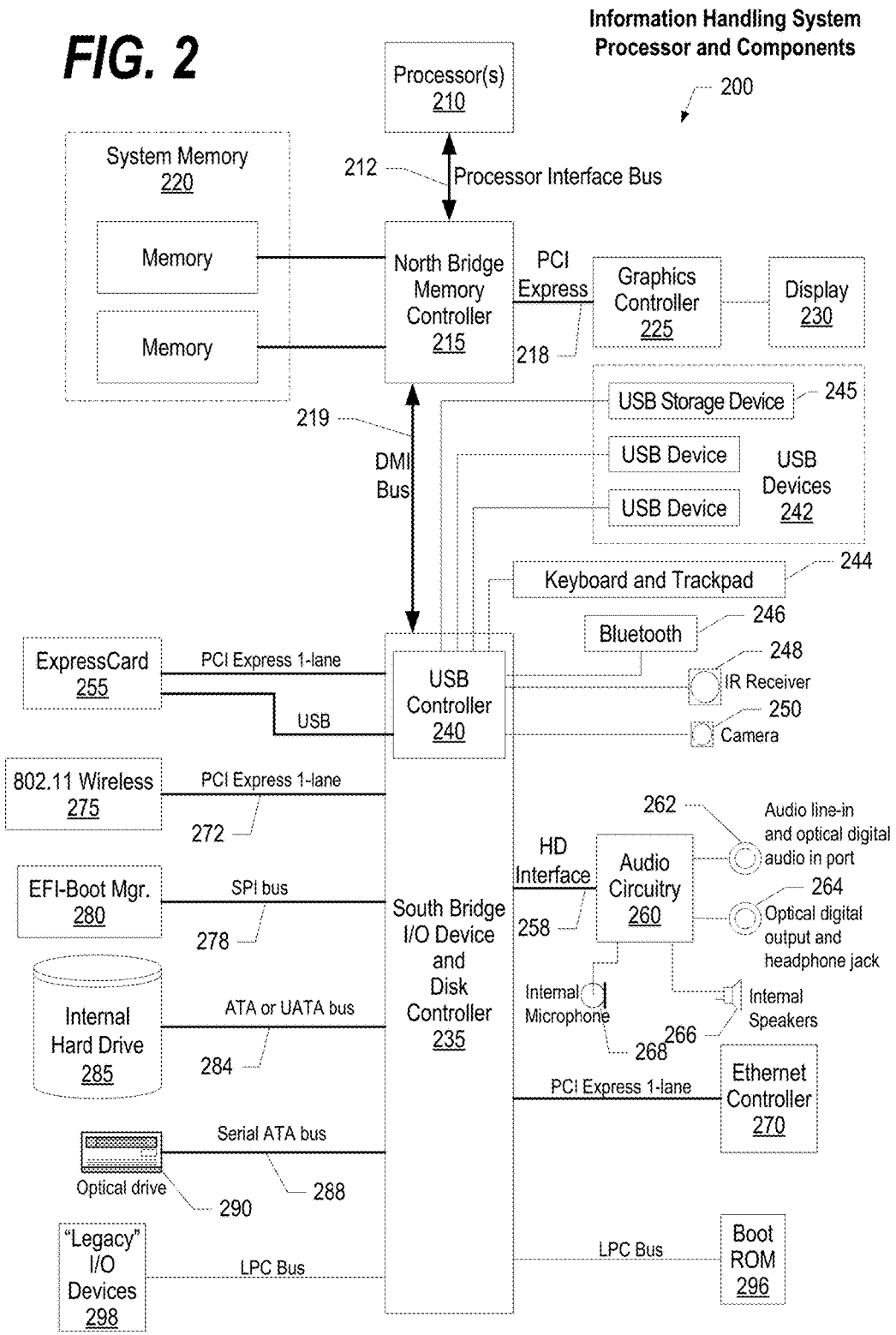
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
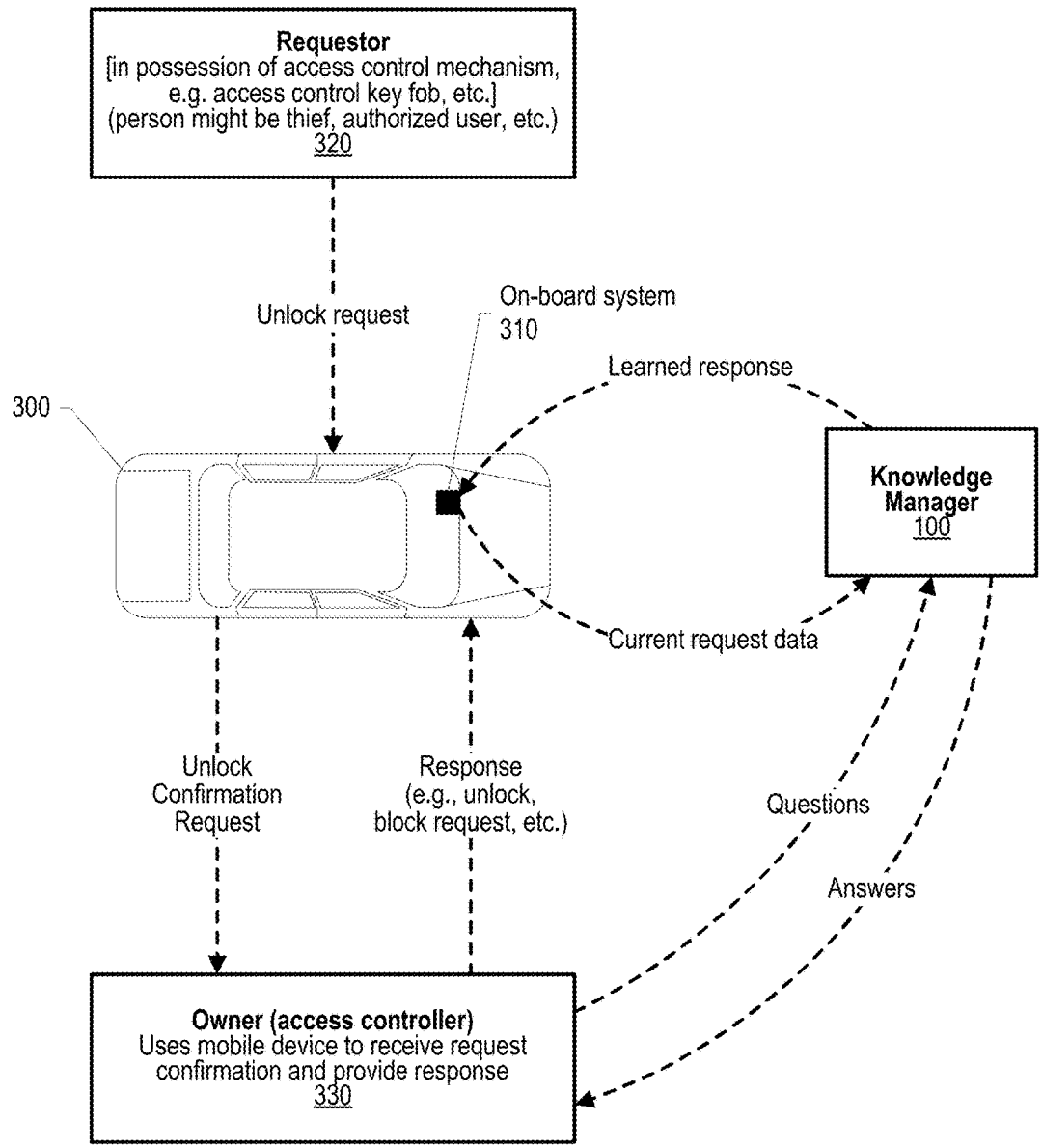
FIG. 3 is a component diagram that depicts components utilized in a cloud based cognitive radio frequency intrusion detection audit and reporting system.

FIG. 3 is a component diagram that depicts components utilized in a cloud based cognitive radio frequency intrusion detection audit and reporting system. Vehicle 300 is a vehicle with on-board system 310 that receives RF requests from requestor 320 and also communicates with owner 330 using the user's mobile device, such as a mobile device. Requestor 320 is a person that is in possession of an access control key mechanism, such as an access control key fob, etc., that is used to attempt to gain access to the vehicle, such as by transmitting an RF "unlock" request to the vehicle. Requestor 320 might be an unauthorized user, such as a thief, or might be an authorized user of the vehicle such as the owner of the vehicle or a friend or family member that has been allowed use of the vehicle by the owner. Owner 330 is a person that controls access to the vehicle by using a mobile device, such as a mobile telephone, to receive the request (e.g., the unlock request, etc.) and the owner uses the mobile device to transmit a response to the vehicle (e.g., indicating whether the request is confirmed ("unlock vehicle"), denied ("secure vehicle"), etc.). In one embodiment, the system utilizes knowledge manager 100, such as a Question Answering (QA) system to provide threat-related responses to the vehicle's on-board system as well as to receive and respond to intrusion detection queries and questions received from owner 330.

Figure 4:
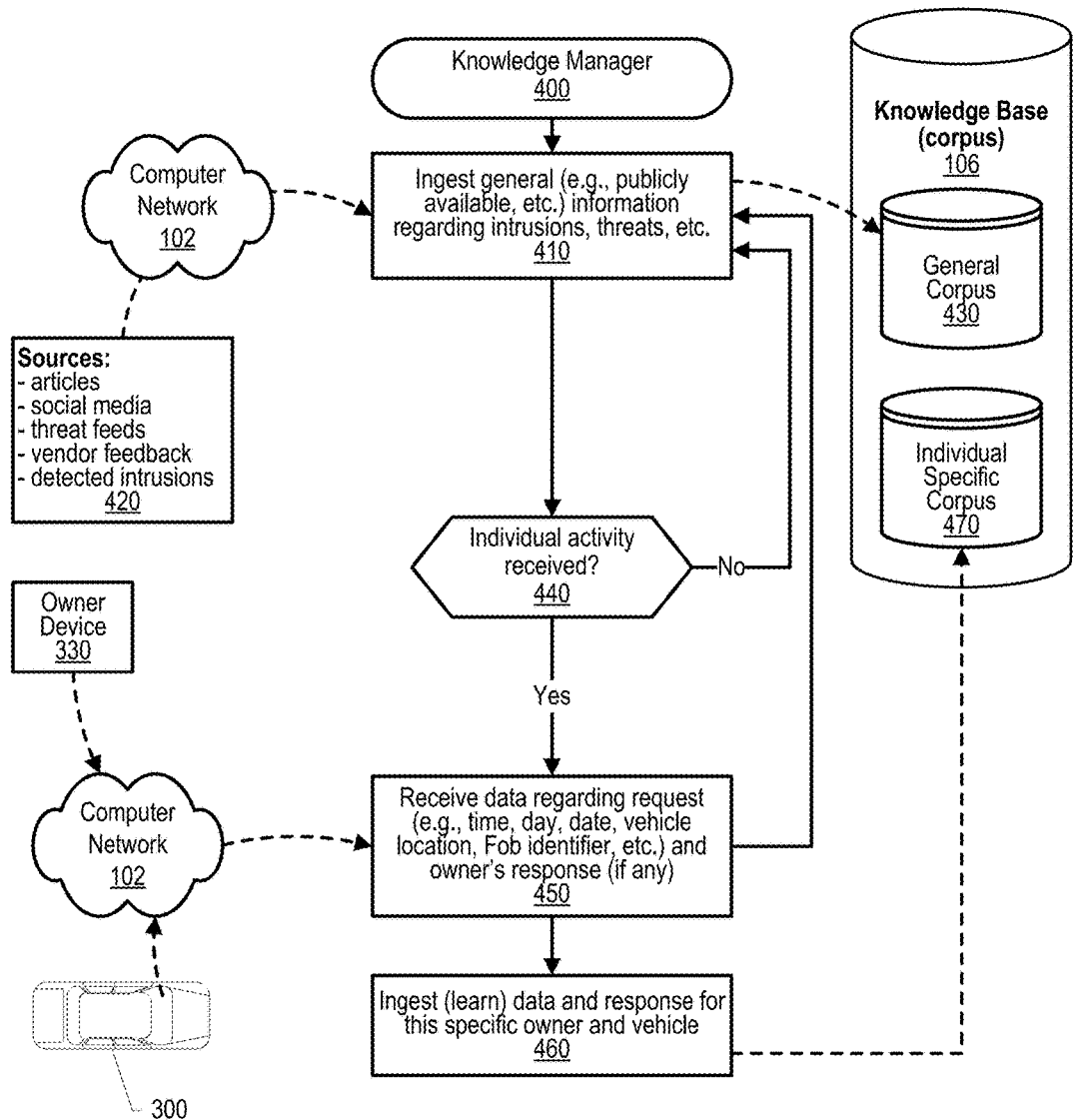
FIG. 4 is a depiction of a flowchart showing the logic used in a knowledge manager process to ingest both general threat-based information as well as vehicle/owner specific data into the manager's overall knowledge base.

FIG. 4 is a depiction of a flowchart showing the logic used in a knowledge manager process to ingest both general threat-based information as well as vehicle/owner specific data into the knowledge manager's overall knowledge base. FIG. 4 processing commences at 400 and shows the steps taken by a Knowledge Manager process that ingests general intrusion-related information as well as signatures regarding a specific vehicle's security requests and responses. At step 410, the process ingests general (e.g., publicly available, etc.) information regarding intrusions, threats, crime areas and the like. Step 410 receives data from sources 420 such as articles, social media feeds, threat feeds such as from law enforcement or the like, vendor feedback data, such as from vehicle manufacturers, regarding known or learned vehicle vulnerabilities, and detected intrusion data (e.g., RF intrusions, etc.) pertaining to other vehicles. Step 410 ingests the data and stores the data into knowledge base 106.

In one embodiment, knowledge base 106 includes general corpus 430 where data pertaining to generally available intrusion related data is stored, as well as individual specific corpora 470. In such an embodiment, each vehicle being managed has an individual specific corpus either stored as a separate corpus or as an area within a larger corpus. The process determines as to whether the on-board vehicle system has detected an RF intrusion request, such as an unlock request, at an individual vehicle (decision 440). When such individual activity received, then decision 440 branches to the 'yes' branch to perform steps 450 and 460 that receive and ingest such information into the appropriate corpus. On the other hand, if individual activity data has not been received, then decision 440 branches to the 'no' branch which loops back to step 410 to continue monitoring available network sources 420 for further general information to ingest into corpus 430.

When individual activity data is received from a vehicle's on-board system, then steps 450 and 460 are performed. At step 450, the process receives the data regarding the RF request (e.g., time, day, date, vehicle location, Fob identifier, etc.) and owner's response to the request (if any). At step 460, the process ingests ("learns") from the received individual activity data and associated response for this specific owner and vehicle. The vehicle specific learned data is stored in individual specific corpus 470.

Figure 5:
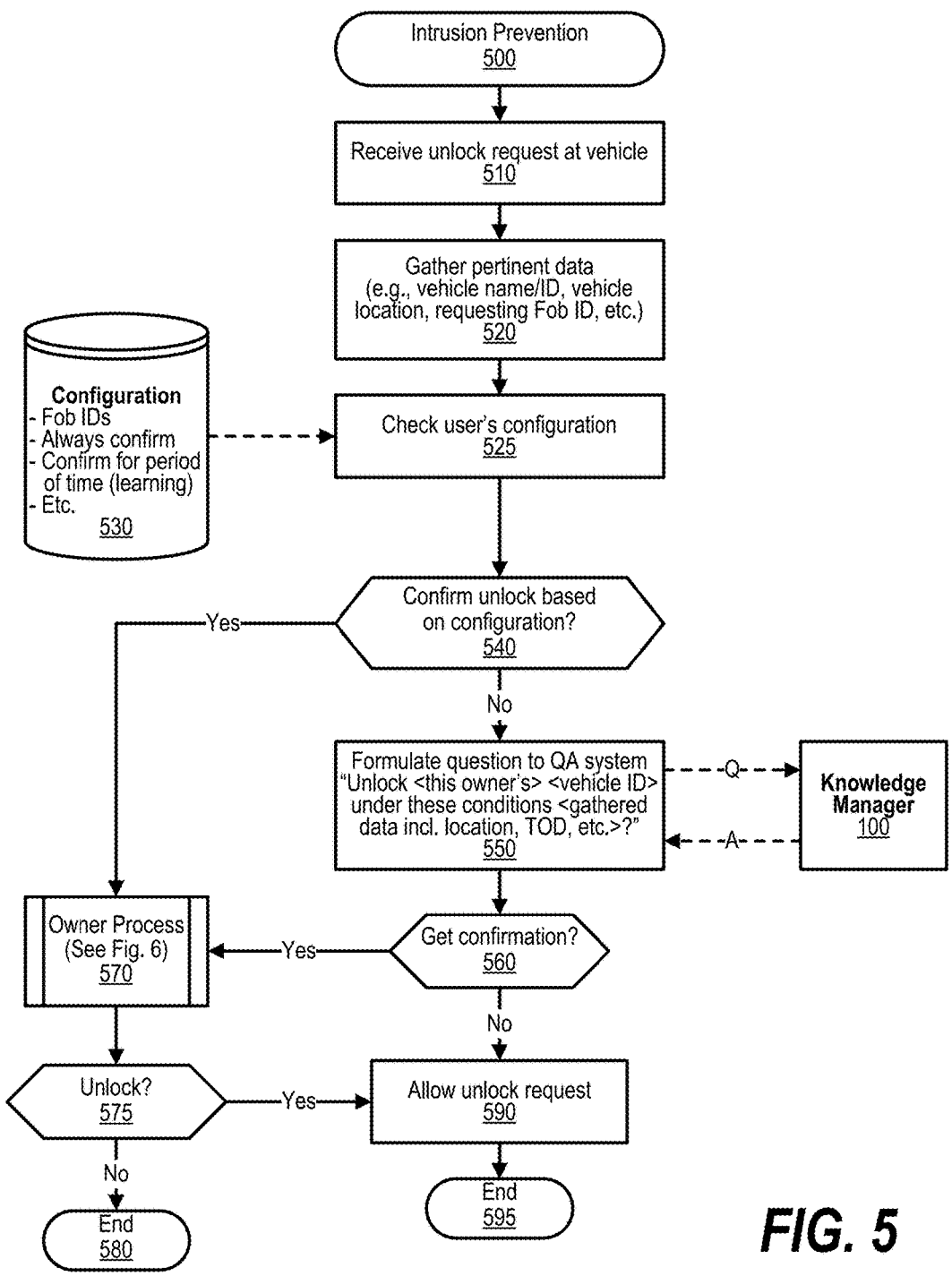
FIG. 5 is a depiction of a flowchart showing the logic used at a device, such as a vehicle, to perform intrusion prevention using a cloud based cognitive radio frequency intrusion detection audit and reporting system.

FIG. 5 is a depiction of a flowchart showing the logic used at a device, such as a vehicle, to perform intrusion prevention using a cloud based cognitive radio frequency intrusion detection audit and reporting system. FIG. 5 processing commences at 500 and shows the steps taken by an intrusion prevention system performed by an on-board system included in a vehicle. At step 510, the process receives a radio frequency (RF) unlock request at the vehicle's on-board system. At step 520, the process gathers pertinent data corresponding to the unlock request. This information may include the vehicle's name and/or unique identifier, the vehicle's current location, data regarding the requesting Fob (ID, name, etc.), and the like. At step 525, the process checks user's configuration by retrieving the configuration data from data store 530. This configuration data includes data about the vehicle as well as user preference data. Data can include the Fob identifiers registered to the vehicle, whether to always confirm an unlock request, whether to confirm unlock requests for period of time to facilitate "learning" of when unlock requests are routinely granted by the authorized user, and the like.

The process determines as to whether to request confirmation of the unlock request based on the configuration settings (decision 540). If the system indicates that the unlock request should be performed based on configuration settings, then decision 540 branches to the 'yes' branch to perform the confirmation process at predefined process 570. On the other hand, if the system indicates that the unlock request does not need to be performed based on configuration settings, then decision 540 branches to the 'no' branch to utilize knowledge manager 100 by step 550 that ascertains whether current conditions warrant a confirmation request being sent to the authorized user's (e.g., owner's) device.

At step 550, the process formulates a question to QA system 100 such as "Unlock <this owner's> <vehicle ID>" and also provides the vehicle's current conditions to QA system 100 for analysis. QA system 100 responds with an answer (A) indicating whether confirmation should be requested, based upon the information in the knowledge manager's corpus acquired over a period of learning regarding conditions and previous requests encountered for this specific vehicle. Based on the QA system response, the process determines as to whether receive confirmation from the authorized user of the vehicle by sending a confirmation request to the mobile device of the authorized user (decision 560). If the system is requesting confirmation, then decision 560 branches to the 'yes' branch to perform predefined process 570. On the other hand, if the system determines that confirmation is not necessary, then decision 560 branches to the 'no' branch whereupon, at step 590, the system allows the unlock request to process unlocking one or more of the vehicle's doors and then the process ends at 595. If confirmation is being requested then, at predefined process 570, the process performs the Owner Process routine (see FIG. 6 and corresponding text for processing details).

The process determines as to whether the authorized user confirmed the unlock request (decision 575). If the authorized user confirmed the unlock request, then decision 575 branches to the 'yes' branch which unlocks the vehicle at step 590 and ends the process at 595. On the other hand, if the authorized user does not respond with an unlock confirmation, then decision 575 branches to the 'no' branch whereupon processing ends at 580 without unlocking the vehicle.

Figure 6:
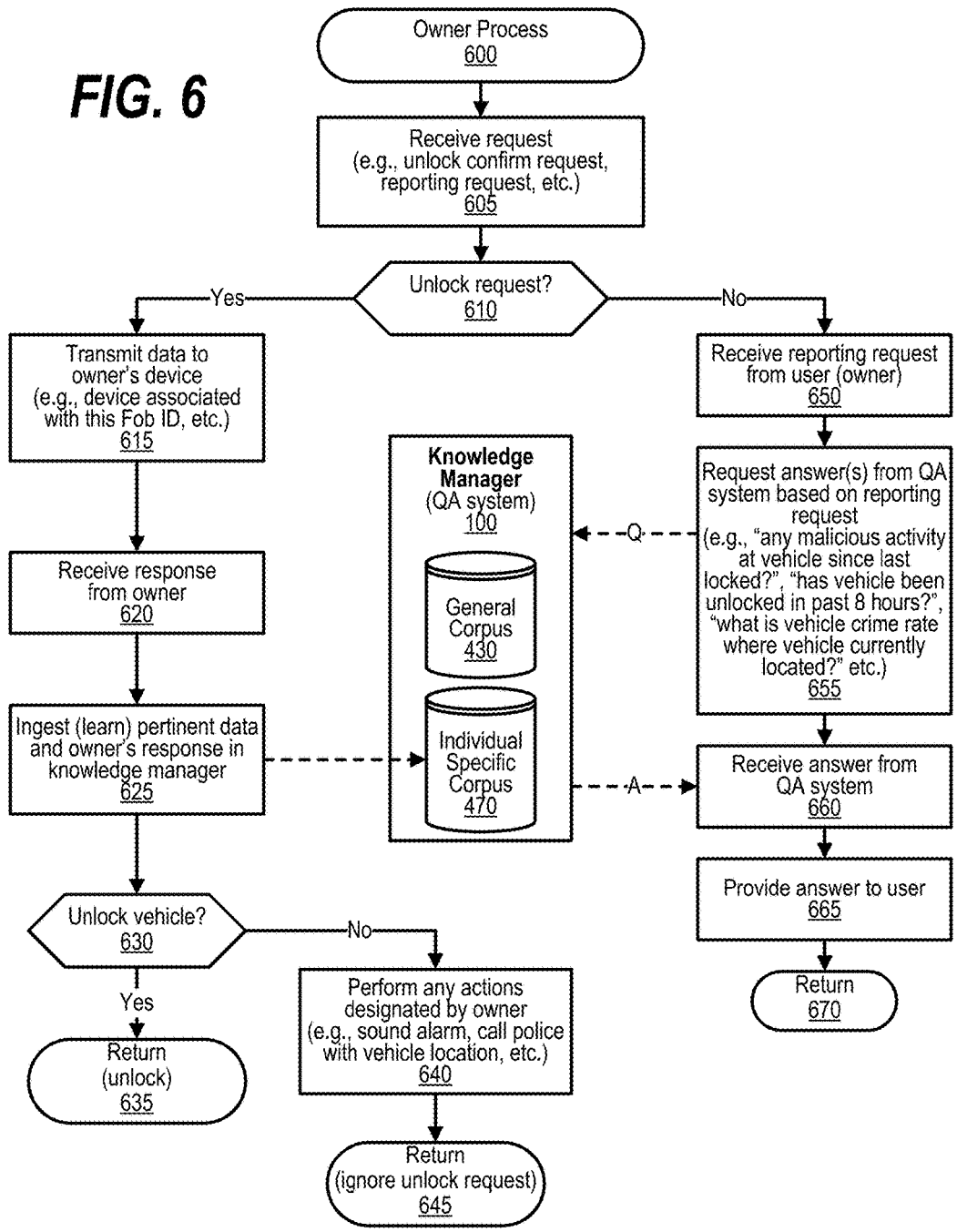
FIG. 6 is a depiction of a flowchart showing the logic used at an owner device, such as a mobile telephone, to respond to requests received from the device's intrusion prevention system.

FIG. 6 is a depiction of a flowchart showing the logic used at an owner device, such as a mobile smart phone device, to respond to requests received from the device's intrusion prevention system. FIG. 6 processing commences at 600 and shows the steps taken by communicating with an owner's, or authorized user's, device to perform a confirmation process. At step 605, the process receives a request (e.g., unlock confirm request, reporting request, etc.). The process determines as to whether the received request is an unlock confirmation request or some other querying or reporting request (decision 610). If the received request is an unlock confirmation request, then decision 610 branches to the 'yes' branch to perform steps 615 through 645. On the other hand, if the received request is not an unlock confirmation request, then decision 610 branches to the 'no' branch to perform steps 650 through 670.

Steps 615 through 645 are performed in response to the request being an unlock confirmation request. At step 615, the process transmits the pertinent request data to the owner's device, such as a mobile device that is associated with the Fob ID used to transmit the request, etc. At step 620, the process receives response from owner such as by interacting with the authorized user via a conversational agent. At step 625, the process ingests, or "learns," from the pertinent data and the owner's response in knowledge manager 100 with the data being ingested into individual specific corpus 470 that corresponds to this vehicle.

The process determines as to whether the authorized user, using the conversational agent, confirmed the unlock request for the vehicle (decision 630). If the unlock request is confirmed, then decision 630 branches to the 'yes' branch returning to the calling process (see FIG. 5) with an indicator that the unlock request has been confirmed. On the other hand, if the unlock request was not confirmed, then decision 630 branches to the 'no' branch to perform step 640. At step 640, the process performs any actions that are designated by the authorized user (owner), such as sounding a vehicle alarm, calling the police with vehicle location information, and the like. If the authorized user does not respond, then, while no additional actions might be performed, the vehicle is still maintained in a secured (locked) state. FIG. 6 processing thereafter returns to the calling routine (see FIG. 5) at 645.

Steps 650 through 670 are performed in response to the request not being an unlock confirmation request. At step 650, the process receives a reporting or query request from the authorized user (e.g., the owner, etc.). Examples of such queries/requests might include "Is this parking zone safe?" (this is compiled through social media feeds using NPL [Natural processing language]), "Provide me with statistics of stolen cars in this area?" (this can be compiled from social media feeds or through police web-site using NPL), "Are there events in the area my GPS is taking me to?" (this is compiled through social media feeds), "How many FOB keys have I used to unlock my car?" (This can be compiled through the application and learned FOB keys used in the vehicle), "How many times have my car been unlocked since I left?" (this can be compiled using time series anomaly detection algorithm), "How many times have I unlocked my car since last week?" (this can be compiled using time series anomaly detection algorithm), "How many threats have been reported through the vehicle manufacturer feed?" (this can be compiled through NPL from the manufacturer's web-site), and "How many security related updates have my car suffered?" (this can be compiled through NPL from the manufacturer's web-site).

At step 655, the process requests answer(s) from QA system 100 based on the reporting/querying request. These questions might be "any malicious activity at vehicle since last locked?", "has vehicle been unlocked in past 8 hours?", "what is vehicle crime rate where vehicle currently located?" etc. At step 660, the process receives an answer from QA system and, at step 665, the process provides the answer to the authorized user. FIG. 6 processing thereafter returns to the calling routine (see FIG. 5) at 670.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a radio frequency (RF) request at a vehicle;
   determining that the received request is a possible unauthorized intrusion, wherein the determining comprises:
      transmitting a question to a question answering (QA) system, wherein the question inquires of the possible unauthorized intrusion, and wherein the QA system has a learned knowledge base of a plurality of previous requests and corresponding user responses; and
      receiving, from the QA system, a response indicating that the RF request is a likely security breach; and
   in response to the determining:
      transmitting a confirmation request to a mobile device associated with an authorized user of the vehicle; and
      safeguarding the vehicle until a positive confirmation is received at the vehicle from the mobile device.

2. The method of claim 1 further comprising:
   collecting a set of current data pertaining to the vehicle and the received request, wherein the question transmitted to the QA system includes the set of current data.

3. The method of claim 2 further comprising:
   wherein collecting the set of current data further comprises collecting data pertaining to a current location of the vehicle; and
   wherein the question inquires of a likelihood of vehicle theft at the current location, and wherein the QA system has a learned knowledge base of a plurality of vehicle crime statistics corresponding to a plurality of locations, wherein the plurality of locations includes the vehicle's current location.

4. The method of claim 1 further comprising:
   logging a set of RF activity detected by a vehicle-based intrusion detection system included in the vehicle, wherein the logged set of RF activities are ingested at the QA system;
   receiving, by a conversational agent with access to the QA system, one or more natural language (NL) user queries pertaining to the detected RF activity; and
   presenting, by the conversational agent, one or more natural language system responses answering the NL user queries.

5. The method of claim 4 wherein a client side of the conversational agent is resident on a mobile device utilized by the user and a server side of the conversational agent is resident a cloud-based system that is accessed via a computer network, and wherein at least one of the NL system response identifies at least some of the logged RF activity as the possible unauthorized intrusion.

6. The method of claim 5 further comprising:
   learning by a cloud based cognitive deep learning system utilized by the QA system, information regarding RF intrusions from a plurality of logged RF activities corresponding to a plurality of vehicles.

7. The method of claim 5 further comprising:
   wherein the information on the detected RF intrusion includes information selected from the group consisting of: information that a key which has never been used to operate the vehicle has been used to unlock the vehicle, information that the vehicle has been tampered with, and information that the vehicle is currently unlocked based on a user proximity to the vehicle.

8. An information handling system comprising:
   one or more processors;
   a memory coupled to at least one of the processors; and
   a set of computer program instructions stored in the memory and executed by at least one of the processors in order to perform actions comprising:
      receiving a radio frequency (RF) request at a vehicle;
      determining that the received request is a possible unauthorized intrusion, wherein the determining includes actions comprising:
         transmitting a question to a question answering (QA) system, wherein the question inquires of the possible unauthorized intrusion, and wherein the QA system has a learned knowledge base of a plurality of previous requests and corresponding user responses; and
         receiving, from the QA system, a response indicating that the RF request is a likely security breach; and
      in response to the determining:
         transmitting a confirmation request to a mobile device associated with an authorized user of the vehicle; and
         safeguarding the vehicle until a positive confirmation is received at the vehicle from the mobile device.

9. The information handling system of claim 8 wherein the actions further comprise:
   collecting a set of current data pertaining to the vehicle and the received request, wherein the question transmitted to the QA system includes the set of current data.

10. The information handling system of claim 9 wherein the actions further comprise:
    wherein collecting the set of current data further comprises collecting data pertaining to a current location of the vehicle; and
    wherein the question inquires of a likelihood of vehicle theft at the current location, and wherein the QA system has a learned knowledge base of a plurality of vehicle crime statistics corresponding to a plurality of locations, wherein the plurality of locations includes the vehicle's current location.

11. The information handling system of claim 8 wherein the actions further comprise:
    logging a set of RF activity detected by a vehicle-based intrusion detection system included in the vehicle, wherein the logged set of RF activities are ingested at the QA system;
    receiving, by a conversational agent with access to the QA system, one or more natural language (NL) user queries pertaining to the detected RF activity; and
    presenting, by the conversational agent, one or more natural language system responses answering the NL user queries.

12. The information handling system of claim 11 wherein a client side of the conversational agent is resident on a mobile device utilized by the user and a server side of the conversational agent is resident a cloud-based system that is accessed via a computer network, and wherein at least one of the NL system response identifies at least some of the logged RF activity as the possible unauthorized intrusion.

13. The information handling system of claim 12 wherein the actions further comprise:
    learning by a cloud based cognitive deep learning system utilized by the QA system, information regarding RF intrusions from a plurality of logged RF activities corresponding to a plurality of vehicles.

14. The information handling system of claim 12 wherein the actions further comprise:
    wherein the information on the detected RF intrusion includes information selected from the group consisting of: information that a key which has never been used to operate the vehicle has been used to unlock the vehicle, information that the vehicle has been tampered with, and information that the vehicle is currently unlocked based on a user proximity to the vehicle.

15. A computer program product stored in a computer readable storage medium, comprising computer program code that, when executed by an information handling system, performs actions comprising:
    receiving a radio frequency (RF) request at a vehicle;
    determining that the received request is a possible unauthorized intrusion, wherein the determining comprises:
        transmitting a question to a question answering (QA) system, wherein the question inquires of the possible unauthorized intrusion, and wherein the QA system has a learned knowledge base of a plurality of previous requests and corresponding user responses; and
        receiving, from the QA system, a response indicating that the RF request is a likely security breach; and
    in response to the determining:
        transmitting a confirmation request to a mobile device associated with an authorized user of the vehicle; and
        safeguarding the vehicle until a positive confirmation is received at the vehicle from the mobile device.

16. The computer program product of claim 15 wherein the actions further comprise:
    collecting a set of current data pertaining to the vehicle and the received request, wherein the question transmitted to the QA system includes the set of current data.

17. The computer program product of claim 16 wherein the actions further comprise:
    wherein collecting the set of current data further comprises collecting data pertaining to a current location of the vehicle; and
    wherein the question inquires of a likelihood of vehicle theft at the current location, and wherein the QA system has a learned knowledge base of a plurality of vehicle crime statistics corresponding to a plurality of locations, wherein the plurality of locations includes the vehicle's current location.

18. The computer program product of claim 15 wherein the actions further comprise:
    logging a set of RF activity detected by a vehicle-based intrusion detection system included in the vehicle, wherein the logged set of RF activities are ingested at the QA system;
    receiving, by a conversational agent with access to the QA system, one or more natural language (NL) user queries pertaining to the detected RF activity; and
    presenting, by the conversational agent, one or more natural language system responses answering the NL user queries.

19. The computer program product of claim 18 wherein a client side of the conversational agent is resident on a mobile device utilized by the user and a server side of the conversational agent is resident a cloud-based system that is accessed via a computer network, and wherein at least one of the NL system response identifies at least some of the logged RF activity as the possible unauthorized intrusion.

20. The computer program product of claim 19 wherein the actions further comprise:
    learning by a cloud based cognitive deep learning system utilized by the QA system, information regarding RF intrusions from a plurality of logged RF activities corresponding to a plurality of vehicles.

* * * * *